US008745396B2

(12) United States Patent
Hui et al.

(10) Patent No.: US 8,745,396 B2
(45) Date of Patent: Jun. 3, 2014

(54) METHOD FOR IMPLEMENTING THE REAL TIME DATA SERVICE AND REAL TIME DATA SERVICE SYSTEM

(75) Inventors: Yi Hui, Shenzhen (CN); Yang Zhou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 162 days.

(21) Appl. No.: 13/257,940

(22) PCT Filed: Dec. 8, 2009

(86) PCT No.: PCT/CN2009/075417
§ 371 (c)(1),
(2), (4) Date: Nov. 28, 2011

(87) PCT Pub. No.: WO2010/139163
PCT Pub. Date: Dec. 9, 2010

(65) Prior Publication Data
US 2012/0102328 A1 Apr. 26, 2012

(30) Foreign Application Priority Data

Jun. 1, 2009 (CN) .......................... 2009 1 0142161

(51) Int. Cl.
*H04L 9/32* (2006.01)
(52) U.S. Cl.
USPC ........................................................ 713/175
(58) Field of Classification Search
None
See application file for complete search history.

(56) References Cited

U.S. PATENT DOCUMENTS 6,978,022 B2 12/2005 Okimoto
7,028,186 B1 4/2006 Stenman et al.
(Continued)

FOREIGN PATENT DOCUMENTS

CN 1251442 C 4/2006
CN 101489094 A 7/2009
(Continued)

OTHER PUBLICATIONS

International Search Report in international application No. PCT/CN2009/075417, mailed on Feb. 11, 2010.

(Continued)

*Primary Examiner* — Farid Homayounmehr
*Assistant Examiner* — Olanrewaju Bucknor
(74) *Attorney, Agent, or Firm* — Oppedahl Patent Law Firm LLC

(57) ABSTRACT

The present invention discloses a method for implement real time data service and a real time data service system. After starting to forward data messages to an accessed user terminal, an access point (AP) of the real time data service system verifies the user terminal, and continues forwarding the data messages to the user terminal after the verification is successful. Therefore, with the method and system of the present invention, when accessing the real time data service system by adopting the way of authentication and key management based on pre-shared key, it is able to authenticate a user before the user obtains a big amount of service data, thereby the accessing security is effectively improved; furthermore, with the method and system of the present invention, it is able to provide free preview service data to the user at first, and after the preview, obtain and verify the WLAN authentication and privacy infrastructure (WAPI) certificate and signature of the user by initiating a signature authentication request to the user, and then start to charge, which is convenient for the user and is favorable for the operators to popularize the real time data service.

11 Claims, 4 Drawing Sheets

(56) References Cited

U.S. PATENT DOCUMENTS

| | | | |
|---|---|---|---|
| 7,076,661 B2 | 7/2006 | Chen et al. | |
| 7,080,397 B2 | 7/2006 | Cochran | |
| 7,257,227 B2 | 8/2007 | Chen | |
| 8,078,874 B2* | 12/2011 | You et al. | 713/175 |
| 8,126,145 B1* | 2/2012 | Tewari et al. | 380/255 |
| 8,595,485 B2* | 11/2013 | Liang et al. | 713/156 |
| 2002/0051539 A1 | 5/2002 | Okimoto | |
| 2002/0076050 A1 | 6/2002 | Chen | |
| 2002/0083438 A1 | 6/2002 | So | |
| 2002/0087971 A1 | 7/2002 | Cochran | |
| 2002/0170053 A1 | 11/2002 | Peterka et al. | |
| 2002/0172366 A1 | 11/2002 | Peterka et al. | |
| 2002/0172368 A1 | 11/2002 | Peterka | |
| 2002/0174366 A1 | 11/2002 | Peterka et al. | |
| 2005/0157877 A1 | 7/2005 | Chen et al. | |
| 2006/0034461 A1* | 2/2006 | Park | 380/277 |
| 2006/0143458 A1 | 6/2006 | Tie et al. | |
| 2008/0133918 A1* | 6/2008 | You et al. | 713/175 |
| 2009/0013378 A1* | 1/2009 | Zhang et al. | 726/1 |
| 2009/0088133 A1* | 4/2009 | Orlassino | 455/411 |
| 2009/0327812 A1* | 12/2009 | Zhang et al. | 714/32 |
| 2010/0246818 A1* | 9/2010 | Yao | 380/44 |
| 2010/0293370 A1* | 11/2010 | Xiao et al. | 713/155 |

FOREIGN PATENT DOCUMENTS

| | | |
|---|---|---|
| CN | 101547340 A | 9/2009 |
| CN | 101583083 A | 11/2009 |
| EP | 1178644 A2 | 2/2002 |
| EP | 1589695 A1 | 10/2005 |
| EP | 1990958 A1 | 11/2008 |
| WO | 02062054 A2 | 8/2002 |

OTHER PUBLICATIONS

English Translation of the Written Opinion of the International Search Authority in international application No. PCT/CN2009/075417, mailed on Feb. 11, 2010.

Huixian Li et al: "Improvement on WLAN Multicast Key Management Protocol", Computational Intelligence and Security, 2008. CIS '08. International Conference on, IEEE, Piscataway, NJ, USA, Dec. 13, 2008. (6 pages—see Supplementary European Search Report in European application number: 09845443.2 for relevant pages).

L.Wu, Y. Zhang, F. Wang: "Security Analysis of WAPI Authentication and Key Exchange Protocol", Communications Engineering Institute, 2007, China. Retrieved from the Internet: URL: http://eprint.iacr.org/2007/344.pdf [retrieved on Dec. 19, 2013]. (10 pages—see Supplementary European Search Report in European application No. 09845443.2 for relevant pages).

Supplementary European Search Report in European application number: 09845443.2, mailed on Jan. 14, 2014. (11 pages—see entire document).

* cited by examiner

METHOD FOR IMPLEMENTING THE REAL TIME DATA SERVICE AND REAL TIME DATA SERVICE SYSTEM

TECHNICAL FIELD

The present invention relates to the field of communications, and in particular to a method for implementing real time data service and a real time data service system.

BACKGROUND

With the maturity of 3G networks and the improvement of mobile terminals on performance, it is possible to perform real time data service with the mobile terminals. For example, users can watch the mobile TV through the mobile TV client, and demand the audio/video programs or watch the audio/video live programs through the mobile stream media client. The development of the real time data service will effectively improve the mobile phone user experience of 3G, and the operations based on the real time data service will become the hotspot and focus of the 3 G operators.

The real time data service comprises: mobile TV, video on demand, live video and the like. After the deployment of the real time data service server in the wireless local area networks (WLAN), users can access the real time data service server through a real time data service client on the mobile terminal to obtain the real time service data stream, and experience the real time data service, such as browsing of the mobile TV programs, video on demand and live video.

Due to the low security of the WLAN, to protect the legal mobile terminals to use the real time data service in security and with high quality and prevent the illegal mobile terminals from accessing the real time data service server, the security of real time data service must be improved by adopting some WLAN authentication and protection protocol. Indeed, the WLAN authentication and privacy infrastructure (WAPI) protocol is the optimum choice.

The WAPI aiming at the security issue of the wired equivalent privacy (WEP) and other protocols in IEEE802.11 is a WLAN security solution provided in the China WLAN National Standard GB15629.11 after repeated argumentation by multiple parties and adequate consideration of various application modes.

In WAPI protocol, access authentication of mobile terminals and negotiation of keys are preformed mainly through the process of authentication and key management provided in WLAN authentication infrastructure (WAI) protocol, and encrypted transmission of data in the media access control (MAC) layer is completed through the process of encryption and decryption provided in WLAN privacy infrastructure (WPI) protocol, so as to guarantee that the legal mobile terminals securely access to the real time data service server.

There are two ways of authentication and key management provided in WAI protocol:

(1) Authentication and key management mode based on certificate, wherein a WLAN mobile terminal (usually called mobile terminal for short) and an access point (AP) exchange their WAPI certificates, authenticate the certificates by an authentication server, and negotiate a base key (BK) during the process of certificate is authentication; after the negotiation of the base key, the mobile terminal and the AP perform negotiation of a session key by using the negotiated base key, to obtain the session key, such as a unicast session key, a multicast key and the like; and (2) Authentication and key management mode based on pre-shared key, wherein the mobile terminal and the AP export the base key by using the same pre-share key (PSK) respectively, and perform negotiation of a session key by using the exported base key, to obtain the session key, such as a unicast session key a multicast key and the like.

Any one of the two ways above can be used in the real time data service system supporting the WLAN as an access network. The authentication and key management mode based on certificate has higher security, but is more complex in process; the AP of the real time data service system needs to generate a base key for each accessed mobile terminal by adopting the elliptic curve key mechanism Diffie-Hellman (ECDH) exchange algorithm, resulting in great amount of calculation. The authentication and key management mode based on pre-shared key has lower security, but is simple in process; a same pre-shared key (i.e., a same base key) can be used by multiple mobile terminals, thereby the amount of calculation of generating the base key and the management cost is reduced.

FIG. 1 shows a flowchart of a method for implementing the real time data service by adopting the way of authentication and key management based on pre-shared key in the prior art, the method comprising:

101: A mobile terminal and an access point (AP) of a real time data service system export a base key (BK) by using a pre-shared key.

102: The mobile terminal and the AP complete negotiation of a session key by using the base key to obtain the session key therebetween, such as a unicast session key, a multicast session key and the like.

On the completion of authentication and negotiation of session key according to the WAI protocol, the AP opens a control port to allow the interaction between the mobile terminal and a real time data service server of the real time data service system.

103: The mobile terminal interacts with the real time data service server to is complete the transmission of a real time data service control signalling;

in this process, control signalling messages are encrypted transmitted between the mobile terminal and the AP by using the unicast session key obtained through negotiation in Step 102, and transmitted by plaintext or other secure ways between the AP and the real time data service server due to relatively secure communication link therebetween.

Wherein, the main functions of the control signalling comprise: negotiating parameters of the real time data service, setting up an audio/video transmission channel, starting/controlling the transmission of audio/video data of the real time data service, etc., for example,

103a: The mobile terminal sends a describe request signalling to the real time data service server through the AP, to send the media parameters supported by the mobile terminal to the real time data service server; the real time data service server sends a describe response to the mobile terminal through the AP, to send the media parameters selected by the real time data service server to the mobile terminal; and through the signalling interactions above, the mobile terminal and the real time data service server complete the negotiation of the real time data service media parameters.

103b: The mobile terminal sends an audio/video transmission channel setup request signalling to the real time data service server through the AP; the real time data service server sends an audio/video transmission channel setup response signalling to the mobile terminal through the AP; and through the signalling interactions above, an audio/video transmission channel is set up between the mobile terminal and real time data service server.

103c: The mobile terminal sends an audio/video data play control signalling, such as Play, Pause, Stop and the like, to the real time data service server through the AP, to play, pause and stop the transmission of the audio/video data.

104: The real time data service server sends the audio/video data to the mobile terminal through the AP.

Also, in this process, the audio/video data messages can be transmitted by plaintext or other secure ways between the AP and the real time data service server, but encrypted transmitted between the AP and the mobile terminal by the unicast session key or the multicast key obtained through negotiation in Step 102.

It should be noted that, in the process of transmitting the audio/video data messages from the real time data service server to the mobile terminal, the control signalling messages can be transmitted at any time between the real time data service server and the mobile terminal, but the audio/video data and the control signalling are not transmitted in the same messages, i.e., the audio/video data and the control signalling are transmitted in different logic channels.

It can be seen from the description above that it is able to avoid the interaction process between the AP and the authentication server, reduce the amount of calculation of the AP and increase the possible quantity of mobile terminals that can simultaneously accessing the AP by adopting the way of WAI authentication and key management based on pre-shared key in the real time data service system. In addition, real time data service operators can provide multiple signed users with the same pre-shared key by using which the users (the mobile terminals) can access the real time data service system for previewing of the real time data service.

However, the method above has the following defects:

1) the base key exported by the pre-shared key has low security; after the pre-shared key is leaked out, an illegal user can negotiate with the AP for the session key by using a base key corresponding to the pre-shared key to access the real time data service system; and 2) incapable of charging so that only free preview programs can be provided to the uses because it is unnecessary to provide the real time data service system with the WAPI certificate of mobile terminal in the way of authentication and key management based on pre-shared key; the users can receive the charging service data only after re-accessing the real time data service system by adopting the way of authentication and key management based on certificate.

SUMMARY

The technical problem to be solved by the present invention is to overcome the defects of the prior art by providing a method for implementing real time data service and a real time data service system, thereby improving the security of accessing the real time data service system by adopting the way of authentication and key management based on pre-shared key.

To solve the problems above, the technical solution of the present invention is realized as follows.

A method for implementing the real time data service comprises:

Verifying user terminal by Access point (AP) when the AP of a real time data service system starts to forward data messages to the accessed user terminal, and continuing forwarding the data messages to the user terminal after the verification is successful.

The method further comprises the process of triggering the AP to perform the verification:

presetting a preview duration threshold and ensuring that the duration in which forwarding data messages from the AP to the mobile terminal exceeds the preview duration threshold;

or, presetting a preview data size threshold and ensuring that the data size of data messages forwarded to the user terminal exceeds the preview data size threshold.

Further, starting a signature verification timer when the AP starts the verification, and stopping forwarding the data messages to the user terminal in the case that the signature verification timer times out and no signature verification response is received from the user terminal.

The process of verification may comprise:

the AP sends a signature verification request to the mobile terminal;

after receiving the signature verification request, the user terminal generates a signature value by using a private key corresponding to a WAPI certificate of the user is terminal, and sends the signature value comprised in a signature verification response to the AP; and the AP decrypts the received signature value by using a public key corresponding to the WAPI certificate, contrasts the consistency of the decrypted value and data to be signed, and determines that the verification is successful when the contrast result is that the decrypted value and the data to be signed are consistent.

The signature verification response may further comprise the WAPI certificate of the user terminal; and after receiving the signature verification response, the AP may further verify the validity of the WAPI certificate with an authentication server, and perform subsequent operations to the signature value when the WAPI certificate is valid.

The method of generating the signature value may be:

the user terminal takes random numbers generated by the AP, or HASH value of the received data messages as the data to be signed, and encrypts the data to be signed by using the private key to generate the signature value.

When performing the verification, the AP may further pause forwarding the data messages to the user terminal.

The method may be performed after the user terminal accesses the real time data service system by adopting the way of authentication and key management based on pre-shared key.

A real time data service system, which is used for providing a user terminal with real time data service, the system comprises: an AP and a user terminal accessing the real time data service system, wherein the AP is used, after forwarding data messages to the user terminal, for verifying the user terminal and continuing forwarding data messages to the user terminal after the verification is successful; and the user terminal is used for cooperating with the AP for the verification.

The system further comprises a signature verification timer, which is used for performing timing operation under control of the AP; and the AP is further used, when starting the verification, for starting the signature verification timer, and stopping forwarding the data messages to the user terminal when the signature verification timer times out and no feedback of the verification is received from the user terminal.

The system further comprises an authentication server, wherein the AP is further used, when receiving a feedback of the verification from the user terminal, for verifying validity of a WAPI certificate comprised in the feedback with the authentication server.

When performing the verification, the AP may be further used for pausing forwarding the data messages to the user terminal.

The user terminal may be a mobile terminal.

To sum up, with the method and system of the present invention, when accessing the real time data service system by adopting the way of authentication and key management based on pre-shared key, it is able to authenticate a user before the user obtains a big amount of service data, thereby effectively improve the accessing security; furthermore, with the method and system of the present invention, it is able to provide free preview service data to the user at first, and after the preview, obtain and verify the WLAN authentication and privacy infrastructure (WAPI) certificate and signature of the user by initiating a signature authentication request to the user and start to charge, thereby is convenient for the user and favourable for the operators to popularize the real time data service.

DETAILED DESCRIPTION

The main idea of the present invention is: a mobile terminal accesses a real time data service system by adopting the way of WAI authentication and key management based on pre-shared key, and after forwarding audio/video data messages to the mobile terminal, an AP of the real time data service system sends a signature verification request to the mobile terminal; and the AP verifies a signature value returned from the mobile terminal, and continues sending the audio/video data messages to the mobile terminal after the verification is passed, otherwise, stops sending the audio/video data messages to the mobile terminal.

The present invention is described below with reference to the accompanying drawings and embodiments in detail.

Figure 1:
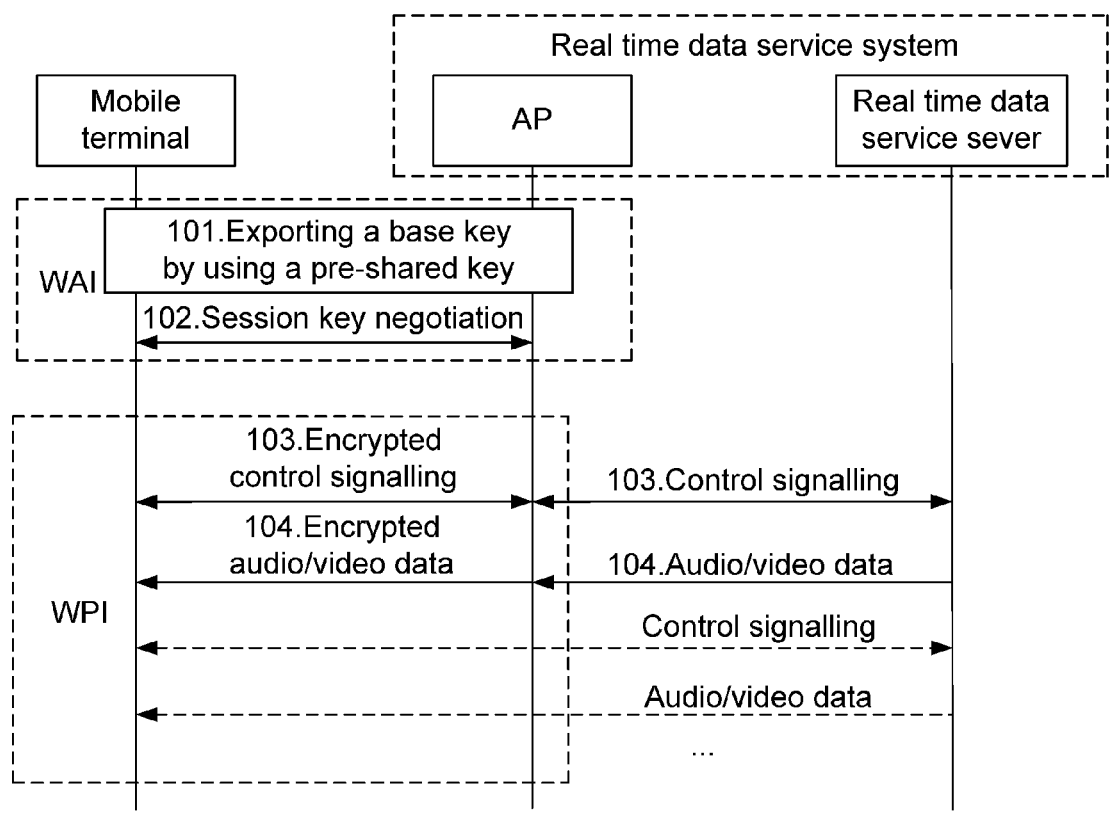
FIG. 1 shows a flowchart of a method for implementing the real time data service by adopting the way of authentication and key management based on pre-shared key in the prior art.
Figure 2:
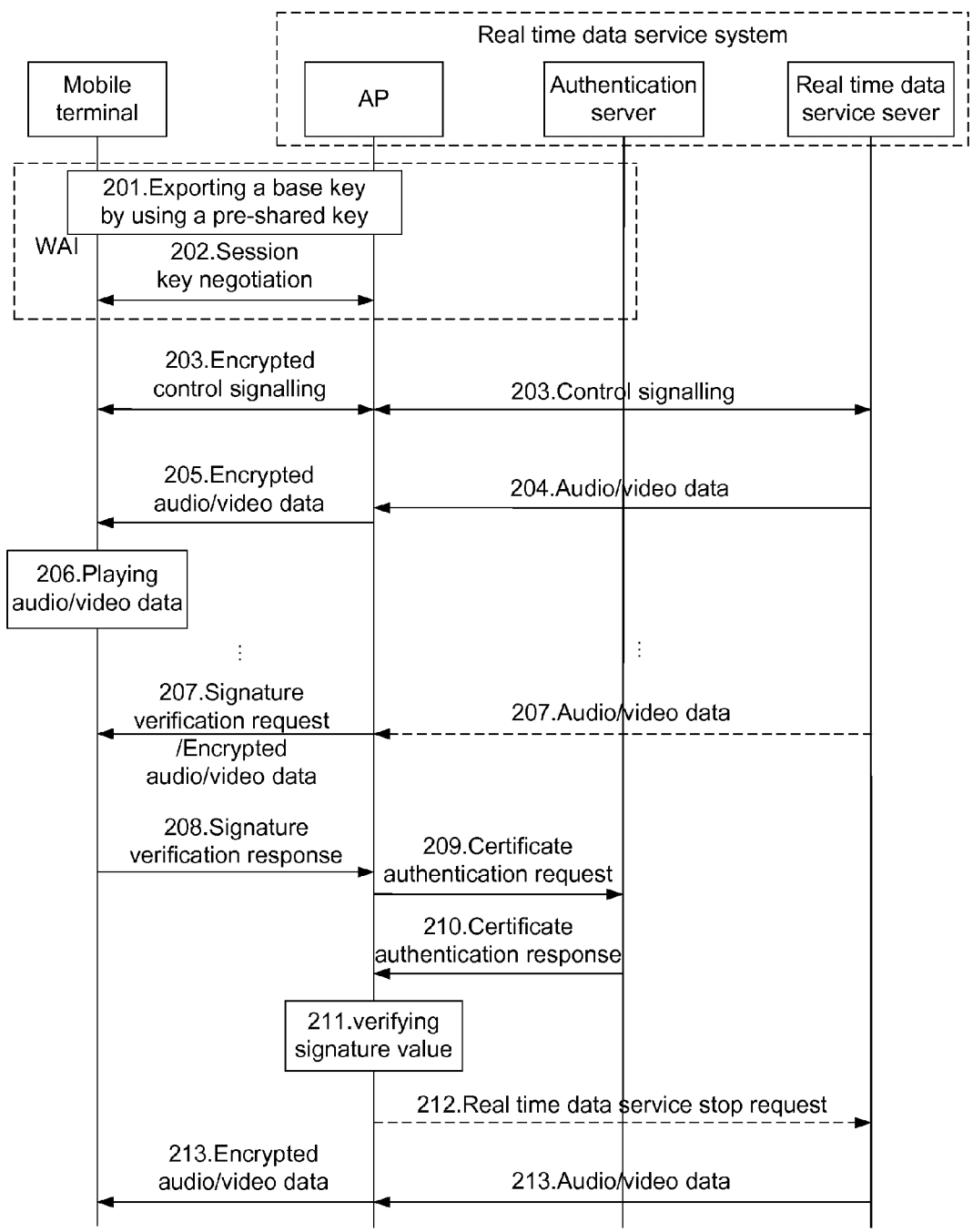
FIG. 2 shows a flowchart of a method for implementing the real time data service based on the WLAN according to an embodiment of the present invention.

FIG. 2 shows a flowchart of a method for implementing the real time data service based on the WLAN according to an embodiment of the present invention. The method comprises:

201: A mobile terminal and an AP of a real time data service system export a base key (BK) by using a pre-shared key.

202: The mobile terminal and the AP complete negotiation of a session key by using the base key, to obtain the session key therebetween, such as a unicast session key, multicast session key and the like.

On the completion of negotiation of session key, the AP opens a control port to allow the interaction between the mobile terminal and a real time data service server of the real time data service system.

203: The mobile terminal interacts with the real time data service server through the AP and transmits the real time data service control signalling messages, to negotiate media parameters of the real time data service, set up an audio/video transmission channel and finally start the real time data service.

Wherein, between the mobile terminal and AP, the control signalling messages after encryption are encapsulated in a MAC protocol data unit (MPDU) for transmission.

204: After the real time data service is started, the real time data service server sends audio/video data messages of the real time data server to the mobile terminal through the AP.

205: After receiving the audio/video data messages sent from the real time data service server to the mobile terminal, the AP encrypts the audio/video data messages by using the session key (multicast session key or unicast session key) obtained through negotiation in Step 202, encapsulates the encrypted audio/video data messages in the MPDU and sends to the mobile terminal.

Figure 3:
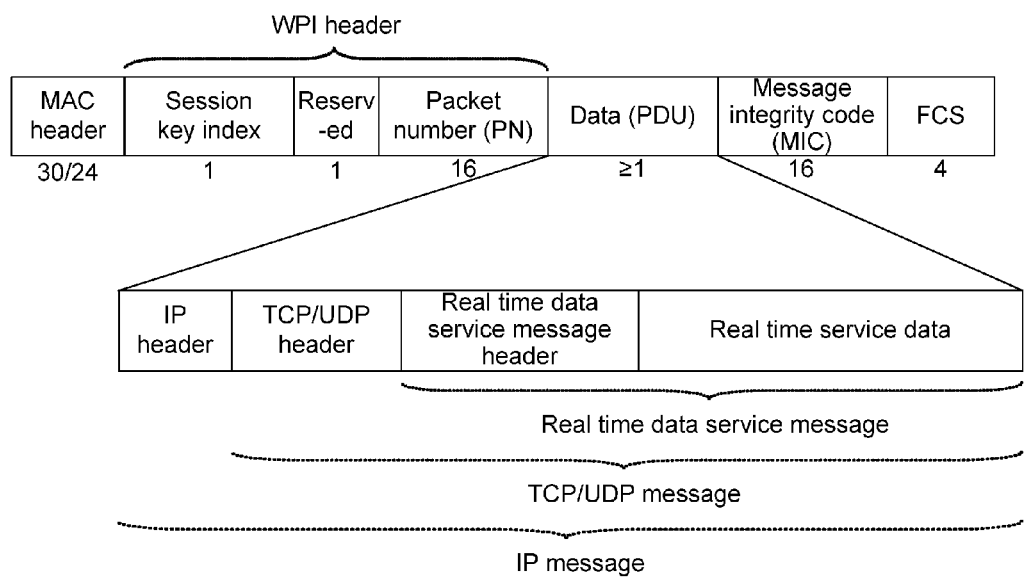
FIG. 3 shows an encapsulation structure diagram of a MPDU of the WPI.

The detailed message encapsulation structure is shown in FIG. 3 which shows an encapsulation structure diagram of a MPDU of the WPI, wherein the length of MAC header field is 24 or 30 bytes;

the length of session key index field is 1 byte, representing the value of unicast session key index (USKID) or multicast session key index (MSKID) or station key index (STAKeyID), i.e., the index of the session key used for encrypting the MPDU;

the length of reserved field is 1 byte;

the length of packet number (PN) field is 16 bytes, wherein the value of the field can be used as an initial vector (IV) required for the data encryption and decryption;

MPDU data are encapsulated in the Protocol Data Unit (PDU) (i.e. data) field which has the maximum length of 2278 bytes, in which upper level protocol data messages are encapsulated, comprising application layer protocol data messages, such as control signalling messages and audio/video data messages and the like of the real time data service;

the length of message integrity code (MIC) field is 16 bytes; and the length of Frame Check Sequence (FCS) field is 4 bytes, which is the frame check sequence of the MAC frame format.

In addition, FIG. 3 further shows a way for encapsulating the control signalling messages and the audio/video data messages of the real time data service.

Wherein, the control signalling messages and the audio/video data messages of the real time data service are collectively called the real time data service message consisting of a real time data service message header and the real time service data; and the types of the real time service data comprises: the control signalling and the audio/video data of the real time data service. The real time data service message header comprises information such as the type of real time service data and the like.

The real time data service message can be encapsulated in a transfer control protocol (TCP) message or a user datagram protocol (UDP) message for transmission. The TCP header and the UDP header comprise information such as port number and the like used by the real time data service.

The TCP message and UDP message can be encapsulated in an internet protocol (IP) message for transmission. The IP header comprises information such as IP address and the like of the mobile terminal/the real time data service server.

It should be noted that, the way for encapsulating the control signalling messages and the audio/video data messages of the real time data service in the PDU field as shown in FIG. 3 is only an example, and the control signalling messages and the audio/video data messages of the real time data service can be encapsulated in other ways.

Now, return to FIG. 2 to go on the discussion of the flow.

206: After receiving the MPDU encapsulated with the audio/video data messages, the mobile terminal decrypts the encrypted audio/video data messages in the PDU field by using the session key (multicast session key or unicast session key) obtained through negotiation in Step 202, and then plays the audio/video data encapsulated in the audio/video data messages.

207: When the duration in which encrypted forwarding the audio/video data to the mobile terminal exceeds a preset duration (can be called a preview duration threshold T), or the data size of the forwarded audio/video data exceeds a preset size (can be is called a preview data size threshold N), the AP sends a signature verification request to the mobile terminal and starts a timer (can be called a signature verification timer).

Figure 4:
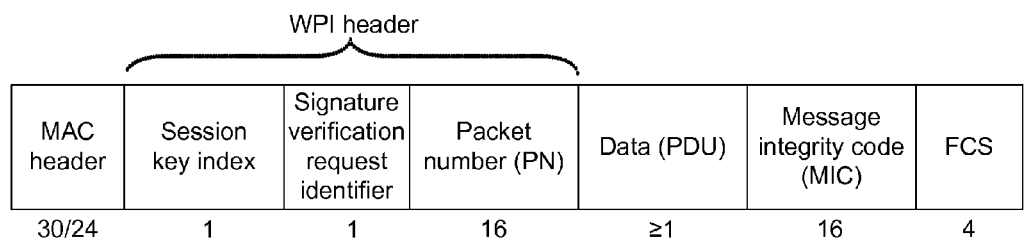
FIG. 4 shows an encapsulation structure diagram of a MPDU comprising a signature verification request identifier.

The signature verification request sent by the AP can be a MPDU comprising a signature verification request identifier. As shown in FIG. 4, the reserved field in the MPDU can serve as the signature verification request identifier. For example, when the value of the field is 1, it is indicated that the MPDU is a signature verification request, and when the field is 0, it is indicated that the MPDU is a normal MPDU encapsulated with control signalling messages or audio/video data messages.

The PDU field of the signature verification request can comprise random numbers generated by the AP, and the mobile terminal can take the random numbers as the data to be signed, or generate the data to be signed by using the random numbers.

Furthermore, the PDU field in the signature verification request can also comprise the encrypted audio/video data messages, i.e., after receiving the audio/video data sent from the real time data service server, the AP encrypts and encapsulates the audio/video data in the MPDU, sets the signature verification request identifier in the MPDU, and sends the MPDU to the mobile terminal.

It should be noted that, after sending the signature verification request, the AP can pause forwarding the audio/video data messages to the mobile terminal, and do not continue forwarding the audio/video data messages until the signature verification is passed. In this process, the AP can cache the audio/video data messages sent from the real time data service server to the mobile terminal.

208: After receiving the signature verification request, the mobile terminal encrypts the data to be signed by using a private key corresponding to the WAPI certificate to generate a signature value, and returns a signature verification response comprising the signature value to the AP.

The data to be signed mentioned above can be all or partial data in the PDU field of the signature verification request, as well as the HASH values of all or partial data in the PDU field. For example, if the PDU field of the signature verification request comprises is random numbers with smaller length generated by the AP, the data to be signed can be the random numbers themselves; and if the PDU field of the signature verification request comprises the encrypted audio/video data messages, the data to be signed can be the HASH values of the audio/video data messages.

Furthermore, the data to be signed mentioned above can also be generated by the mobile terminal. For example, the data to be signed can be random numbers generated by the mobile terminal. In such case, the mobile terminal needs to comprise the data to be signed in the signature verification response to send to the AP, so that the signature value can be verified by the AP.

Furthermore, the signature verification response can also comprise the WAPI certificate of the mobile terminal, and the WAPI certificate comprises its corresponding public key. Indeed, if the public key of the WAPI certificate of the mobile terminal is pre-stored in the AP, the signature verification response may not comprise the WAPI certificate.

209: After receiving the signature verification response, if the response comprises the WAPI certificate of the mobile terminal, the AP sends a certificate authentication request comprising the WAPI certificate to the authentication server of the real time data service system to verify the validity of the WAPI certificate.

If the AP does not receive any signature verification response sent by the mobile terminal before the signature verification timer times out, turn to Step 212.

210: After receiving the certificate authentication request, the authentication server verifies the WAPI certificate in the certificate authentication request, and comprises the certificate verification result in the certificate authentication response to send to the AP.

211: The AP learns the validity of the WAPI certificate according to the certificate verification result returned from the authentication server, or determines the validity of the WAPI certificate by locally verifying the WAPI certificate; if the WAPI certificate of the mobile terminal is invalid (for example, revoked or expired and the like), turn to Step 212; if the WAPI certificate is valid, the AP verifies the signature value comprised in the signature verification response by using the public key corresponding to the WAPI certificate; and if the signature verification is successful, execute Step 213; if the signature verification is failed, execute Step 212.

In the actual application, the process of the signature verification may comprise the following steps:

211*a*: the signature value comprised in the signature verification response is decrypted by using the public key corresponding to the WAPI certificate of the mobile terminal to obtain a decrypted value; and

211*b*: the decrypted value is contrasted with the data to be signed, if they are the same, it is indicated that the signature value is correct and the signature verification is confirmed to be successful, and if they are different, it is indicated that the signature value is wrong and the signature verification is confirmed to be failed.

As described above, the data to be signed can be all or partial data saved in the PDU field when sending the signature verification request by the AP, or the HASH values of all or partial data in the PDU field; the data to be signed can also be the data generated by the mobile terminal and comprised in the signature verification response.

212: If the signature verification is failed, or no signature verification response sent from the mobile terminal is received when the signature verification timer times out, the AP stops forwarding the received audio/video data messages to the mobile terminal; moreover, the AP can send a real time data service stop request to the real time data service server to indicate the real time data service server to stop sending the audio/video data to the mobile terminal.

213: If the signature verification is successful, the AP continues forwarding the audio/video data messages sent from the real time data service server to the mobile terminal.

According to the basic principle of the present invention, the embodiments above can have various modifications. For example:

(1) After sending the signature verification request, the AP can also continue forwarding the audio/video data messages to the mobile terminal until the signature verification is failed or the signature verification timer times out, so as to avoid the cached audio/video data messages occupying the system resource of the AP.

Furthermore, after sending the signature verification request, the AP can also directly drop the received audio/video data messages.

(2) The data to be signed can be not only the random numbers generated by the AP, the HASH values of the audio/video data messages sent by the real time data service server, and the random numbers generated by the mobile terminal, but also other MPDU fields except for the PDU field in the signature verification response.

Indeed, if the data to be signed is the random numbers generated by the AP, or the HASH values of the audio/video data messages sent by the real time data service server, the replay attack initiated by an illegal mobile terminal can be prevented to the maximum extent.

(3) The preview duration threshold T and preview data size threshold N can also be random values.

(4) After the verifications of the WAPI certificate of the mobile terminal and the signature value are successful, the AP can start to charge the users (for example, according to traffic or duration) by using the WAPI certificate, or notify the charging network element in the real time data service server to start to charge (for example, the AP sends a charging request message comprising the WAPI certificate to the charging network element every 10 mins, so as to indicate the charging network element to charge the users according to the duration, or the AP sends a charging request message comprising the WAPI certificate to the charging network element every time the audio/video data messages of 1M is forwarded, so as to indicate the charging network element to charge the users according to the traffic).

Figure 5:
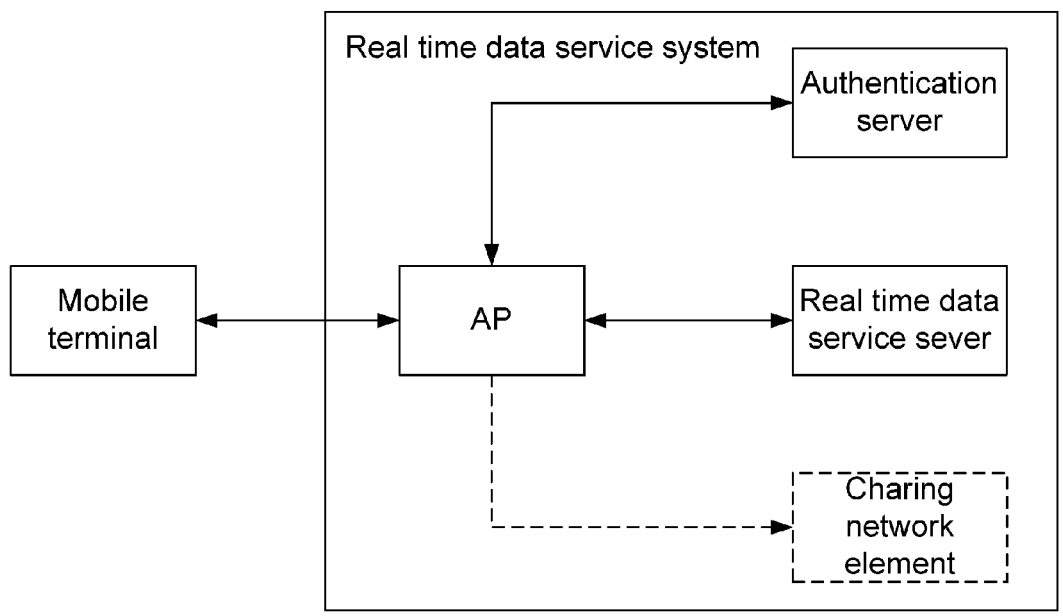
FIG. 5 shows a structural diagram of a real time data service system for implementing the method of the present invention.

FIG. 5 shows a structural diagram of a real time data service system for implementing the method of the present invention; as shown in FIG. 5, the system comprises: an AP, a real time data service server and an authentication server, in which, the real time data service server is used, after the mobile terminal accesses the real time data service system by adopting the way of authentication and key management based on pre-shared key and starts the real time data service, for sending the audio/video data messages of the real time data service to the mobile terminal through the AP;

the AP is used for forwarding the audio/video data messages of the real time data service to the mobile terminal, and sending a signature verification request to the mobile terminal when the duration in which forwarding the audio/video data messages exceeds the preview duration threshold or the data size of the forwarded audio/video data messages exceeds the preview data size threshold; and the AP is used, after receiving a signature value generated by the mobile terminal by using a private key corresponding to the WAPI certificate of the mobile terminal, for verifying the signature value by using a public key corresponding to the WAPI certificate, and stopping forwarding the audio/video data messages of the real time data service to the mobile terminal if the verification is failed; and the authentication service is used, after receiving the certificate verification request, for verifying the validity of the WAPI certificate comprised in the request and returning a certificate verification result.

The AP is further used, after receiving the signature verification response, for sending the certificate verification request comprising the WAPI certificate of the mobile terminal to the authentication server, and determining whether the WAPI certificate is a valid certificate according to the certificate verification result returned by the authentication server; verifying the signature value if the WAPI certificate is a valid certificate; and stopping forwarding the audio/video data messages of the real time data service to the mobile terminal if the WAPI certificate is an invalid certificate.

The AP is further used, when sending the signature verification request, for starting the signature verification timer, and before the signature verification timer times out, is stopping forwarding the audio/video data messages of the real time data service to the mobile terminal if no signature value that sent by the mobile terminal is received.

The AP is further used, when sending the signature verification request, for pausing forwarding the audio/video data messages of the real time data service to the mobile terminal; and after receiving the signature verification response, continuing forwarding the audio/video data messages of the real time data service to the mobile terminal if the signature value verification is successful.

The specific function of each network element comprised in the real time data service system and the exchange relationship between the network elements can be seen from the description of the method shown in FIG. 4, no further description is needed here.

It should be noted that, the method and system of the present invention that mentioned above are described directed to a mobile terminal, but, in the actual application, communication entities capable of performing the operations such as corresponding access and verification and the like are not limited to a mobile terminal, other user terminals such as a fixed terminal and the like that capable of indirectly access through the mobile network can also perform the operations such as access and verification and the like. In fact, any user terminals capable of performing the operations such as access and verification and the like are suitable regardless of their types.

Therefore, it can be seen from the description above that, with the method and system of the present invention, when accessing the real time data service system by adopting the way of the authentication and key management based on pre-shared key, it is able to authenticate a user before the user obtains a big amount of service data, thereby the accessing security is effectively improved; furthermore, with the method and system of the present invention, it is able to provide free preview service data to the user at first, and after the preview, obtain and verify the WLAN authentication and privacy infrastructure (WAPI) certificate and signature of the user by initiating a is signature authenticating request to the user, and then start to charge, which is convenient for the user and favourable for the operators to popularize the real time data service.

The above are only the preferred embodiments of the present invention and not intended to limit the protection scope of the present invention, and any modifications, equivalent replacements, improvements and the like within the spirit and principle of the present invention shall fall within the protection scope of the present invention.

The invention claimed is:

1. A method for implementing real time data service, comprising:

verifying mobile terminal by Access Point (AP) when the AP of a real time data service system starts to forward data messages of the real time data service to the accessed mobile terminal, and continuing forwarding the data messages of the real time data service to the mobile terminal after the verification is successful;

the method further comprising the process of trigging the AP to perform the verification:

presetting a preview duration threshold and ensuring that the duration in which forwarding data messages of the real time data service from the AP to the mobile terminal exceeds the preview duration threshold;

or, presetting a preview data size threshold and ensuring that the data size of data messages of the real time data service forwarded to the mobile terminal exceeds the preview data size threshold;

wherein the method is performed after the mobile terminal accesses the real time data service system by adopting an authentication and key management mode based on re-shared key;

the process of verification comprises:

the AP sends a signature verification request to the mobile terminal;

after receiving the signature verification request, the mobile terminal generates a signature value by using a private key corresponding to a wireless local area network authentication and privacy infrastructure (WAPI) certificate of the mobile terminal, and sends the signature value comprised in a signature verification response to the AP; and the AP decrypts the received signature value by using a public key corresponding to the WAPI certificate contrasts whether the result of the AP decrypting the received signature value and data to be signed are consistent, and determines that the verification is successful when the contrast result is that the decrypted value and the data to be signed are consistent.

2. The method according to claim 1, further comprising: starting a signature verification timer when the AP starts the verification, and stopping forwarding the data messages to the mobile terminal in the case that the signature verification timer times out and no signature verification response is received from the mobile terminal.

3. The method according to claim 2, wherein when performing the verification, the AP further stops forwarding the data messages to the mobile terminal.

4. The method according to claim 1, wherein
the signature verification response further comprises the WAPI certificate of the mobile terminal; and
after receiving the signature verification response, the AP further verifies the validity of the WAPI certificate with an authentication server, and performs subsequent operations to the signature value when the WAPI certificate is valid.

5. The method according to claim 1, wherein the method of generating the signature value is:
the mobile terminal takes random numbers generated by the AP, or hash values of the received data messages as the data to be signed, and encrypts the data to be signed by using the private key to generate the signature value.

6. The method according to claim 1, wherein when performing the verification, the AP further stops forwarding the data messages to the mobile terminal.

7. A real time data service system, which is used for providing a mobile terminal with real time data service, the system comprising: an Access Point (AP) and a mobile terminal accessing the real time data service system, wherein
the AP is used, after forwarding data messages of the real time data service to the mobile terminal, for verifying the mobile terminal and continuing forwarding data messages of the real time data service to the mobile terminal after the verification is successful; and
the mobile terminal is used for cooperating with the access point for the verification;
the system further comprising a signature verification timer, which is used for performing timing operation under control of the AP, wherein
the AP is further used, when starting the verification, for starting the signature verification timer, and stopping forwarding the data messages of the real time data service to the mobile terminal when the signature verification timer times out and no feedback of the verification is received from the mobile terminal;
the mobile terminal is further used for:
accessing the real time data service system by adopting an authentication and key management mode based on pre-shared key;
receiving a signature verification request from the AP;
generating a signature value by using a private key corresponding to a wireless local area network authentication and privacy infrastructure (WAPI) certificate of the mobile terminal;
sending the signature value comprise in a signature verification response to the AP;
the AP is further used for:
sending a signature verification request to the mobile terminal;
decrypting the received signature value by using a public key corresponding to the WAPI certificate;
contrasting whether the result of the AP decrypting the received signature value and data to be signed are consistent; and
determining that the verification is successful when the contrast result is that the decrypted value and the data to be signed are consistent.

8. The system according to claim 7, further comprising an authentication server, wherein the AP is further used, when receiving a feedback of the verification from the mobile terminal, for verifying validity of a wireless local area network authentication and privacy infrastructure (WAPI) certificate comprised in the feedback with the authentication server.

9. The system according to claim 8, wherein when performing the verification, the AP is further used for stopping the forwarding of the data messages to the mobile terminal.

10. The system according to claim 7, wherein when performing the verification, the AP is further used for stopping the forwarding of the data messages to the mobile terminal.

11. The system according to claim 7, wherein the mobile terminal is a mobile terminal.

* * * * *